Nov. 4, 1924.
C. CLAUSEN
TIRE RIM
Filed April 28, 1922
1,514,436
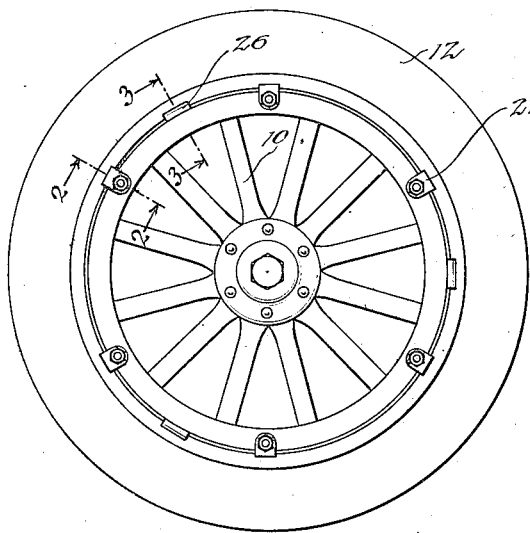
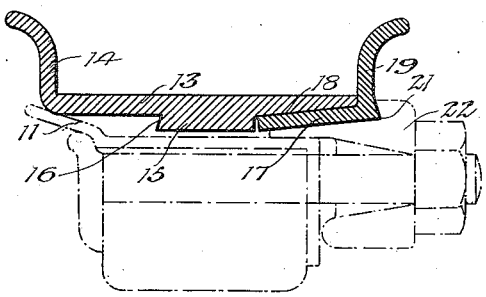
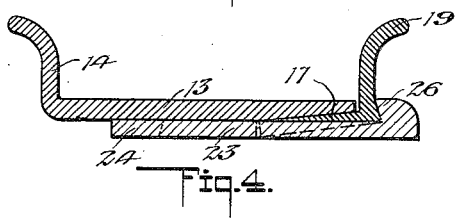
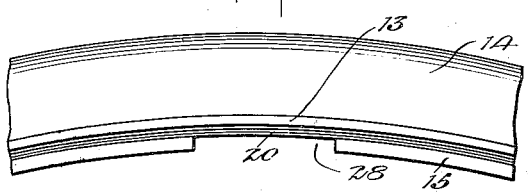
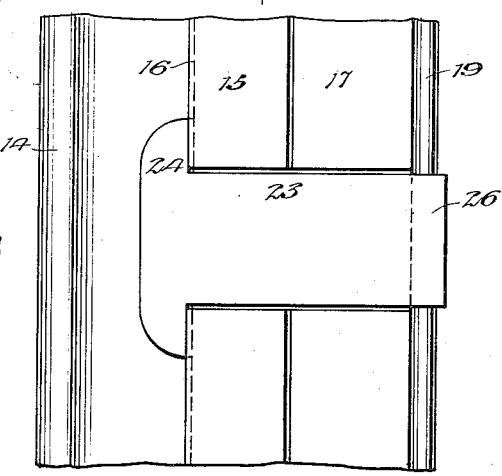
WITNESSES
INVENTOR
Carl Clausen
BY
ATTORNEYS Patented Nov. 4, 1924.

1,514,436

UNITED STATES PATENT OFFICE.

CARL CLAUSEN, OF BISBEE, ARIZONA.

TIRE RIM.

Application filed April 28, 1922. Serial No. 557,146.

*To all whom it may concern:*

Be it known that I, CARL CLAUSEN, a citizen of the United States, and resident of Bisbee, in the county of Cochise and State of Arizona, have invented a new and Improved Tire Rim, of which the following is a full, clear, and exact description.

My invention relates to a tire rim and aims to provide certain new and useful improvements in connection with a device of this character.

It is an object of the present invention to provide a rim for the mounting of either a straight-side or clincher type of tire, and by means of which it will be possible to effect a mounting or dismounting of this tire from the rim in the shortest interval of time.

It is a further object of the present invention to provide a rim which shall embody an extremely simple construction, comprising essentially two main interlocking parts.

A further object of the present invention is that of constructing a rim, the parts of which will be securely held in position when placed upon the felly, this retention being effected by means of the conventional construction embracing the felly band, wedges, bolts and nuts.

My invention still further contemplates the provision of a tire rim which shall comprise a circumferentially split body, the parts of which are constructed in such a manner as to interlock to provide a complete rim.

Still other objects of the present invention are that of providing a tire rim the parts of which may readily be assembled or disengaged, and which will serve to prevent any cutting of the tire or tube when the latter is carried by the rim.

With these and further objects in mind reference is had to the attached sheet of drawings as illustrating one practical embodiment of my invention, and in these drawings it will be seen that:

Figure 1 shows a side view of a rim embodying my improved construction, which rim is mounted upon a wheel and serves to carry the tire.

Figure 2 is an enlarged transverse sectional view taken along the line 2—2 and in the direction of the arrows indicated in Figure 1.

Figure 3 is an enlarged sectional transverse view taken along the line 3—3 and also in the direction of the arrows illustrated in Figure 1.

Figure 4 is a fragmentary bottom plan view of the device as shown in Figure 3.

Figures 5 and 6 are edge views of the rim portions, and

Figure 7 is a side elevation of one of the locking members or keys for the rim sections.

It will be seen, reference being had to Figures 1 and 2 that the reference numeral 10 indicates the wheel carrying the conventional felly band 11 the latter mounting the rim embodying my improved construction, which in turn carries the tire 12.

Reference being had particularly to Figures 2 and 3 it will be seen that the rim comprises essentially two portions, one of which includes a body 13 presenting a flat outer face extending across the entire space adapted to be occupied by the inner portion of the tire 12 this body also presenting a flange 14 adjacent its outer side edge which flange may be of any desired construction consistent with the type of tire to be mounted upon the rim.

The body 13 also presents an inwardly extending annular rib 15 upon its inner face, and this rib has that edge nearest to the flange 14 under-cut as has been indicated at 16, and for a purpose hereinafter specified, and it will be noted that this rib serves to stiffen the rim to retain the latter in a true circular shape, and also acts as an aid to the centering of the said rim.

The second rim section conveniently includes a body 17 presenting an inwardly inclined face 18, as in Figure 5, and also carries a flange 19 adjacent its outer edge, which flange when the parts are associated with each other corresponds in function, and in positioning to the flange 14 and serves to retain the tire in proper position. As aforestated the upward face of the body 17 is inclined, and the inner face of the body 13 at a point between the rib 15 and the inner edge of this body is at an angle corresponding to the angle of inclination of the face 18, as at 20. Thus these rim parts may readily be brought to a position at which the body 13 will wholly overlie the body 17, and the entire device will present the appearance of one unit, it being further noted that the flange 19 adjacent its face is preferably formed with an outwardly extending portion 21.

Thus it will be understood that a circumferentially split head is provided through which the inner tube and casing may readily be removed, or these elements may also readily be mounted upon these rim sections, it being noted in either instance that it will be only necessary to either remove or attach the second portion of the rim to the first portion of the rim.

Further with a view of normally retaining the sections of the rim in applied position with respect to each other, it will be seen that when this rim is carried upon the wheel that the conventional wedge member 22 co-operating with the outwardly extending portion 21 will serve to press the last described rim section against the first mentioned section, the latter being prevented from moving by virtue of its engagement with the felly band 11 upon which it is mounted. On the other hand, if it is desired to carry the rim as a "spare" this may readily be accomplished by the use of keys such as has been shown in Figure 7. This key conveniently comprises a body portion presenting a shank 23, and a head 24, these portions presenting in aggregate a T shape, the said head having its inner edges cut as at 25 to an angle corresponding to the degree of under-cutting to which the rim 15 is subjected as at 16.

An outwardly extending lug portion 26 is formed at the inner end of the shank 23, and has its inner edge under-cut as at 27, at an angle corresponding substantially to the angle at which the portions 21 project outwardly. Thus as in Figures 5 and 6 in which it will be noted that the rib 15 is interrupted by the grooves 28, and the lower face of the body 17 also has grooves cut into it, which latter grooves are adapted to align with the grooves 28, the key may be placed in the position shown in Figures 3 and 4. In other words the head thereof will have its edge 25 bearing against the edge 16 of the rib 15, while its shank 23 extends through the interrupted portion of the rib 15, and also within the groove formed in the body 17, the lug 26 extending upwardly along the outer face of the flange 19, and having its edge 27 engaged by the projecting portion 21 of this latter member.

Thus it will be understood that the keys will serve to retain the rim parts in applied position with respect to each other, incident to the fact that the edge portions 25 and 27 will co-operate with the edge portion 16 and portion 21, and prevent any movement of these parts with respect to each other. By the provision of this key it will also be understood that the rim may serve to carry an inflated tube and casing, as a "spare" and it will be appreciated that when the rim has its parts retained in this manner that the said rim may be applied to the felly of a wheel without moving the case, as has been shown in Figure 1. In the event that a tire and inner tube become deflated, due to puncture, etc., it is obvious that after making the necessary repairs to tire and inner tube they can be placed on the rim and mounted on wheel without the use of lock keys, since the keys are only necessary when carrying inflated spare tires.

From the foregoing it will be understood that the objects of this invention are accomplished in view of the fact that the main rim section or base carrying the tire being flat, a perfect bearing will be provided for the full width of whatever size tire the rim may be designed for, thus precluding any danger of the cutting of the tube or casing.

Furthermore it will be understood that the rim sections are readily separable and capable of association with each other, and that the necessity of an operator utilizing tools to effect a dismounting of the tire is absolutely precluded, it being further understood that any danger of the rim sections becoming accidentally separated is also prevented, due to the provision of the keys when the rims are carried as "spares."

Furthermore the rim will embody a relatively great amount of strength, and it will not be necessary to remove the case when applying the rim to the felly of a wheel, although it will be understood that these keys are not essential for ordinary mounting of rims and tires, and that the same are only required for carrying spare inflated tires for quick mounting.

It will further be appreciated that numerous modifications of structure might readily be resorted to without in the least departing from the scope of my claims; which are—

1. A rim comprising major and minor sections having side flanges, the inner side of the major section having one edge portion beveled and the minor section being inclined to correspond to the bevel of the major section, a rib formed on the inner side of the major section between the edges thereof and having transverse grooves, and keys having shanks passing through said grooves and formed with undercut lugs engaged with the flange of said minor section, said lugs being provided with laterally projecting heads engaging the adjacent side wall of said rib, said heads and said ribs having their opposed sides undercut whereby the keys are securely connected to said sections.

2. A rim comprising major and minor sections having side flanges, a rib formed on the inner side of the major section between the edges thereof and having transverse grooves, and keys having shanks passing through said grooves and formed with undercut lugs engaged with the flange of said minor section, said lugs being provided with laterally projecting heads engaging the adjacent side wall of said rib, said heads and said rib having their opposed sides undercut whereby the keys are securely connected to said sections.

3. A rim comprising major and minor sections having side flanges, the major and minor sections having their adjacent edge portions overlapped, a rib formed on the inner side of the major section between the edges thereof and having transverse grooves, and separate and detachable keys having flanges passing through said grooves and formed with undercut lugs engaged with the flanges of said minor section, said lugs being provided with laterally projecting heads engaging the adjacent side walls of said rib, the opposed sides of said rib and said head being oppositely beveled and being flatly engaged with each other whereby the keys are securely connected to said sections.

CARL CLAUSEN.